United States Patent
Peng

(10) Patent No.: US 12,530,238 B2
(45) Date of Patent: Jan. 20, 2026

(54) SMART WEB CLUSTER ROUTING

(71) Applicant: SAP SE, Walldorf (DE)

(72) Inventor: Yang Peng, Pleasanton, CA (US)

(73) Assignee: SAP SE, Walldorf (DE)

( * ) Notice: Subject to any disclaimer, the term of this patent is extended or adjusted under 35 U.S.C. 154(b) by 533 days.

(21) Appl. No.: 18/082,261

(22) Filed: Dec. 15, 2022

(65) Prior Publication Data

US 2024/0202039 A1    Jun. 20, 2024

(51) Int. Cl.
*G06F 9/46* (2006.01)
*G06F 9/50* (2006.01)
*H04L 67/63* (2022.01)

(52) U.S. Cl.
CPC ............ *G06F 9/5044* (2013.01); *H04L 67/63* (2022.05); *G06F 2209/501* (2013.01); *G06F 2209/503* (2013.01)

(58) Field of Classification Search
None
See application file for complete search history.

(56) References Cited

U.S. PATENT DOCUMENTS

| | | | |
|---|---|---|---|
| 10,248,547 B2 | 4/2019 | Peng et al. | |
| 10,503,572 B2 | 12/2019 | Peng et al. | |
| 10,565,089 B2 | 2/2020 | Yu et al. | |
| 10,719,431 B2 | 7/2020 | Peng et al. | |
| 10,963,451 B2 | 3/2021 | Peng | |
| 11,153,374 B1 | 10/2021 | Yu et al. | |
| 11,188,661 B2 | 11/2021 | Peng | |
| 11,275,812 B2 | 3/2022 | Peng | |
| 11,301,221 B2 | 4/2022 | Peng | |
| 11,455,304 B2 | 9/2022 | Peng | |
| 2016/0098292 A1* | 4/2016 | Boutin | G06F 9/4881 718/104 |
| 2016/0323161 A1* | 11/2016 | Cuervo Laffaye | G06F 9/5044 |
| 2021/0182732 A1 | 6/2021 | Peng | |

OTHER PUBLICATIONS

U.S. Appl. No. 17/879,413, filed Aug. 2, 2022, Peng.

* cited by examiner

*Primary Examiner* — Bing Zhao
(74) *Attorney, Agent, or Firm* — Fish & Richardson P.C.

(57) ABSTRACT

The present disclosure relates to computer-implemented methods, software, and systems for distributing task execution at nodes of a web service cluster. A request is sent from an interface gateway to execute a task at a first service node at a web service cluster. The first service node is one of a plurality of service nodes at the web service cluster. The first service node is selected to execute the task based on evaluating a resource status matrix defining resource statuses of the plurality of service nodes in the web service cluster and resource requirements of the task. A status response from the first service node is obtained after executing the task. The status response comprises a current resource snapshot of the first service node. The resource status matrix is updated based on the obtained status response from the first service node.

20 Claims, 4 Drawing Sheets

SMART WEB CLUSTER ROUTING

TECHNICAL FIELD

The present disclosure relates to computer-implemented methods, software, and systems for data processing.

BACKGROUND

Software complexity is increasing and causes changes to lifecycle management and maintenance of software applications, databases, and platform systems. Customers' needs are transforming and imposing higher requirements for process execution, lifecycle management, and technical landscape that also support high availability to access software resources provided by the underlying platform.

SUMMARY

Implementations of the present disclosure are generally directed to a computer-implemented method for distributing task execution at nodes of a web service cluster. The task distribution can optimize resource utilization and timing of the task execution.

In some implementations, an example of a method for distributing task execution at nodes includes: receiving, at an interface gateway, a request to distribute a task for processing at a web service cluster; sending a request to execute the task at a first service node at the web service cluster, wherein the first service node is one of a plurality of service nodes at the web service cluster, and wherein the first service node is selected to execute the task based on evaluating a resource status matrix defining resource statuses of the plurality of service nodes in the web service cluster and resource requirements of the task; obtaining a status response from the first service node after executing the task, wherein the status response includes a current resource snapshot of the first service node; and updating the resource status matrix based on the obtained status response from the first service node.

In some instances, updating the resource status matrix includes generating an updated resource status matrix for use for subsequent evaluations associated with received requests for distributing tasks for processing at the web service cluster at the interface gateway.

In some instances, the web service cluster provides resources for executing tasks of a set of task types, wherein a task type is associated with a task type criteria comprising corresponding resource requirements for executing a task of the task type at a service node. The method can include maintaining information for resource requirements for types of tasks that are executable at service node on the web service cluster.

In some instances, the method can include obtaining information for consumed resources by the first service node to execute the task; and evaluating a first task criteria definition for a task type of the task executed by the first service node to determine whether to adjust the resource requirements for the task.

In some instances, the method can include determining resource requirements for a plurality of tasks executable by service nodes of the web service cluster, wherein each of the plurality of tasks is associated with resource requirements corresponding to a respective type of the task.

In some instances, the resource requirements for executing a task of a first task type are determined based on evaluating historical data for executed tasks of the first task type at one or more service nodes at the web service cluster.

In some instances, the method can include registering, at the interface gateway, the service nodes of the web service cluster for processing requests received at the interface gateway.

In some instances, the method can include receiving from a first service node a current status snapshot of the first service node.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

The present disclosure describes various tools and techniques for distributing task execution at nodes of a web service cluster. The task distribution can improve resource utilization and timing of the task execution.

In some instances, web services can be used in the context of executing computationally heavy tasks that require a lot of hardware resource (memory and/or storage space) and immediate feedback for the execution status. For example, some tasks may require huge amounts of data processing, in memory computing, multi-core execution, and at the same time have a requirement for fast feedback to understand whether the tasks would not be executed. In some examples, such computationally heavy tasks may require consistency in their response time. In those instances, web services can be dedicated to such heavy tasks, for example, real-time video motion detection and face recognition processing, system monitoring, etc. Those tasks may be associated with requirements for fast processing and immediate feedback notification. In some instances, those tasks can be mission critical tasks for a system process that also has resource intense characteristics. In some instances, execution of such tasks (requiring fast processing and quick response time) can be performed in a web service architecture that supports resource load balancing and notification indications in accordance with implementations of the present disclosure.

Figure 1:
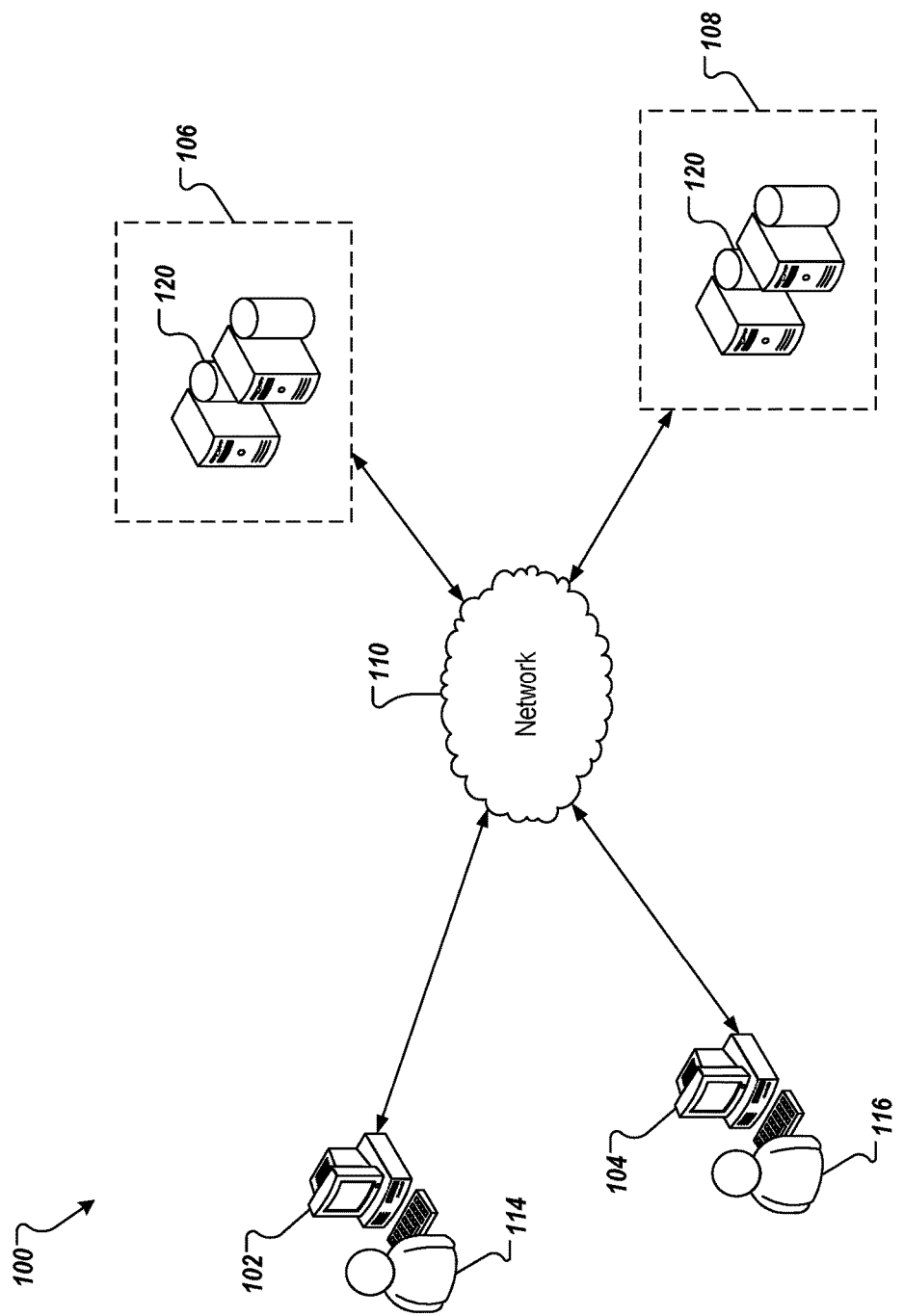
FIG. 1 is a block diagram depicting an example computer-implemented system that can execute implementations of the present disclosure in accordance with implementations of the present disclosure.

FIG. 1 is a block diagram depicting an example computer-implemented system 100 that can execute implementations of the present disclosure. In the depicted example, the example system 100 includes a client device 102, a client device 104, a network 110, a cloud environment 106, and a cloud environment 108. The cloud environment 106 may include one or more server devices and databases (e.g., processors, memory). In the depicted example, a user 114 interacts with the client device 102, and a user 116 interacts with the client device 104.

In some examples, the client device 102 and/or the client device 104 can communicate with the cloud environment 106 and/or cloud environment 108 over the network 110. The client device 102 can include any appropriate type of computing device, for example, a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 110 can include a large computer network, such as a local area network (LAN), a wide area network (WAN), the Internet, a cellular network, a telephone network (e.g., PSTN), or an appropriate combination thereof connecting any number of communication devices, mobile computing devices, fixed computing devices and server systems.

In some implementations, the cloud environment 106 includes at least one server and at least one data store 120. In the example of FIG. 1, the cloud environment 106 is intended to represent various forms of servers including, but not limited to, a web server, an application server, a proxy server, a network server, and/or a server pool. In general, server systems accept requests for application services and provides such services to any number of client devices (e.g., the client device 102 over the network 110).

In accordance with implementations of the present disclosure, and as noted above, the cloud environment 106 can host applications and databases running on the host infrastructure. In some instances, the cloud environment 106 can include multiple cluster nodes that can represent physical or virtual machines that can represent web node clusters. A hosted application and/or service can run on VMs hosted on cloud infrastructure.

In some instances, the cloud environment 106 and/or the cloud environment 108 can provide infrastructure for running web cluster nodes that can be configured to execute computationally heavy tasks that can be managed and executed in a manner to provide fast feedback for failures and timely processing results. In some instances, the cloud environments can receive requests for such heavy computation tasks from users, for example, via user interface(s), and distribute the load of the task execution between various web service nodes included in a web service cluster.

Figure 2:
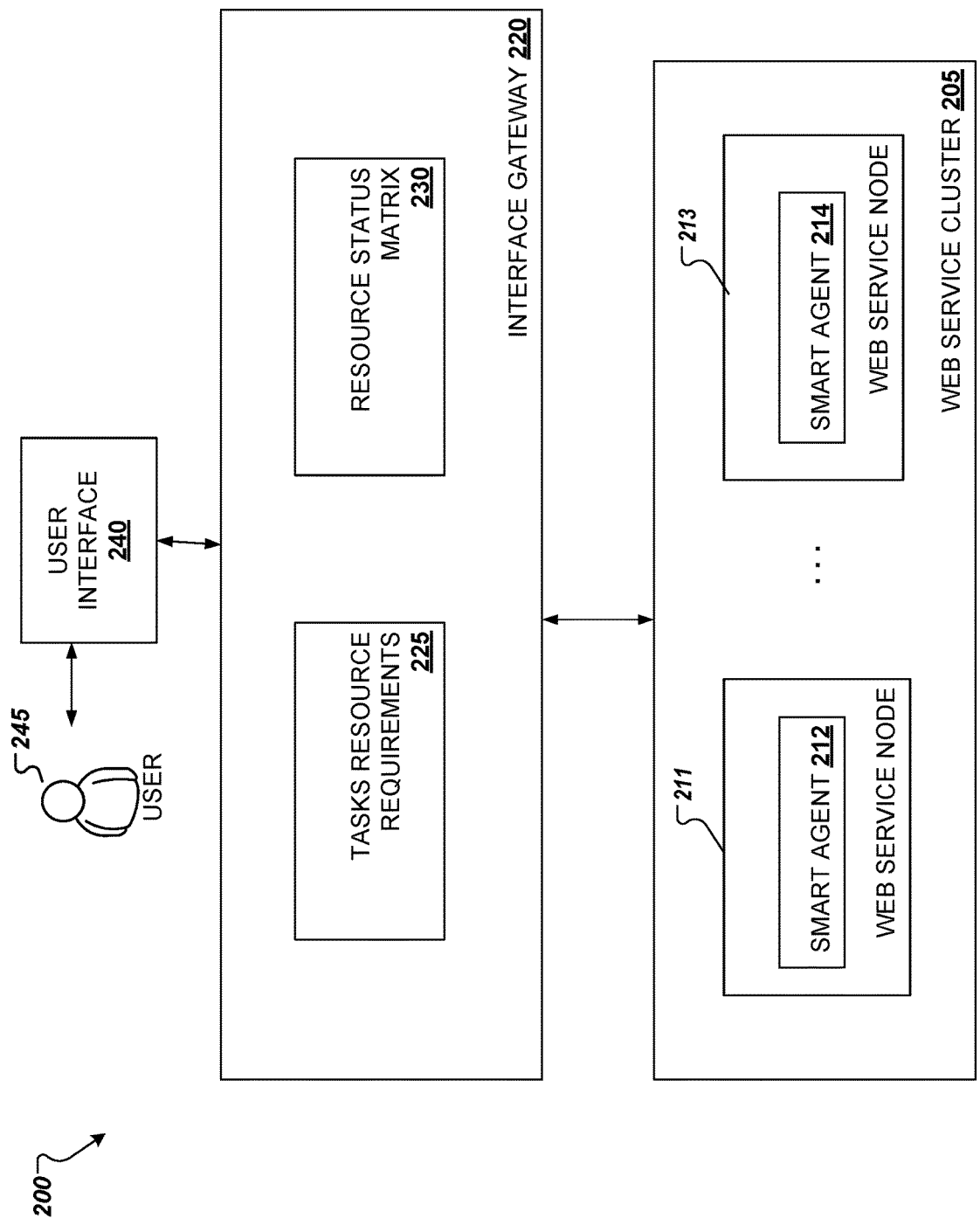
FIG. 2 is a block diagram of an example computing environment, including an interface gateway that is configured to route requests for task execution to service nodes from a web service cluster based on distribution considering resource availability in accordance with implementations of the present disclosure.

FIG. 2 is a block diagram of an example computing environment 200, including an interface gateway that is configured to route requests for task execution to service nodes from a web service cluster 205 based on distribution considering resource availability in accordance with implementations of the present disclosure. In some implementations, the web service cluster 205 can be instantiated to provide computing resources for execution of tasks. For example, resource heavy tasks including motion detections, and tracking and monitoring, batch processes including processing of a vast amount of records (e.g., thousands of records) in an enterprise software environment, among other example tasks requiring a lot of resources for the task processing (e.g., above a threshold level of computing resources provided by a computer machine and/or above a threshold level of time). For example, the execution of such tasks can be critical for the performance of a monitored system, and thus, those tasks may be associated with requirements for "fast failure" notifications. Other systems, such as enterprise resource systems, may also be under strict time constraints to process data. This problem can become more acute in a global environment where access to up-to-date data is needed 24 hours a day.

In accordance with the implementations of the present disclosure, the computing environment 200 can be setup with a simple yet efficient service architecture that can focus on the execution of tasks that have high computational requirements and at the same time have fast feedback requirements to notify users for task failure. In some instances, the architecture can facilitate the execution of tasks with improved resource expenditures and with improved timing.

The web service cluster 205 includes a set of web service nodes, including web service node 211 to web service node 213. It should be noted that while only two web service nodes are shown in FIG. 2, any number of web service nodes may be used in accordance with the principles of this invention. The web service nodes from the web service cluster 205 can receive requests for processing tasks from a user 245 (or multiple separate users) through a user interface 240 (or multiple separate user interfaces). In some implementations, the user 245 can send requests for task execution at the web service cluster 250.

The computing environment 200 includes an interface gateway 220 that can be configured as a smart routing layer to dispatch received requests for execution of tasks that require fast processing and are computationally expensive. The interface gateway 220 can select a node from the web service cluster 205 that is suited to handle the task(s) in a timely manner based on awareness of the resource requirements of the task and the current load of the nodes of the cluster 205. The task(s) can be received from the user interface 240 (e.g., from user 245) or from another interface and/or input source. In some instances, the task(s) can be dispatched to node(s) that are selected in a manner that improves the overall throughput of the task execution at the web service cluster 205.

In some implementations, the web service nodes from the web service cluster 205 can be communicatively coupled with the interface gateway 220 to receive tasks and to provide responses based on the task executions. The web service nodes from the web service cluster 205 can be configured with smart agents, such as smart agent 212 on web service node 211 and smart agent 214 on web service node 213. The smart agents (e.g., 212 and/or 214) can be used to acquire requests received for task execution and to process information for the task and the status of the respective node (e.g., current resource status of the node, including memory status, I/O usage, network utilization, CPU usage, and connections made, among other examples). The smart agents can be configured to communicate with the interface gateway 220 to exchange status information for task execution and for the current state of the node. The status information can be used by the interface gateway 220 to perform smart routing to nodes from the cluster 205 that have hardware and software capacity to process the requests (e.g., based on consideration of the tasks criteria for computational resources) within an expected time frame (e.g., considering a timeliness requirement for the tasks).

In some implementations, the interface gateway 220 can be configured to process a set of tasks to be distributed to respective nodes of the web service cluster 205. The tasks can be associated with resource requirements. The interface gateway 220 can store information for the requirements at the task resource requirements 225 storage, for example, in form of a file or set of files. The resource requirements for a task can be predefined, for example, configured as default requirements at the interface gateway 220 and/or the requirements can be iteratively learned for the web service cluster 205. For example, a task can be predefined to have a task criteria defining resource requirements including at least 5 GB memory and at least 100 GB hard disk space for the task execution.

In some instances, the web service cluster 205 can provide resources for executing tasks of a set of task types. A task type can be associated with task type criteria comprising corresponding resource requirements for executing a task of the task type at a service node.

In some instances, a list of tasks can be defined with initially estimated resource requirements. The list of tasks can include tasks that are of different task types. Based on execution of the tasks (of various types) at nodes of the web service cluster 205 and obtaining information for the resource requirements per task type. In some implementations, the requirements can be mapped to different task type(s) 227. The requirements per task of a given type from the list can be updated over time to be more accurate. For example, data for task executions can be collected as historical data and used for performing prediction for the resource requirements per task at a given node. In some instances, some or all nodes of the web service cluster 205 can provide the same computing resources and capabilities for task execution. In other instances, some of the nodes within web service cluster could be different from each other such that routing specific task types to certain nodes over other nodes can be advantageous.

In some instances, when a request for a task is received at the interface gateway 220, the task criteria for the type of the task can be determined (e.g., from the task resource requirements 225) and that task criteria information can be used to select a node from the web service cluster 205 to send the task. The selection of a node from all the node in the cluster 205 can be based on information of the current resource status of each of the nodes. In some instances, the interface gateway 220 can store information about the resource status of each node in the form of a matrix, at the resource status matrix 230. The resource status matrix 230 can include information for a current snapshot of the resources status (e.g., identifying availability of the node by providing information of the available CPU and/or hardware bandwidth of the node) of each of the nodes in the cluster 205. Thus, by having information about the task requirements (e.g., based on the task resource requirements 225) and matching them with the capabilities of a node (e.g., as defined in the resource status matrix 230), a selection of a node from the cluster 205 that improves the load balance can be performed.

In some implementations, the interface gateway 220 can obtain information about the current status of each node from the web service cluster 205 dynamically when receiving information for execution of a particular task.

In some implementations, a first task can be received at the interface gateway 220 and task requirements can be determined from the tasks resource requirements 225. If the interface gateway 220 has not yet obtained information about the current resource status of each node from the web service cluster 205, the interface gateway 220 can select a node from the cluster 205 ats random (e.g., based on round-robin scheduling). In some instances, when a node is not associated with a resource status at the interface gateway 220, it can be considered that the node is not yet configured to receive quests based on the logic implemented for distributing requests at the interface gateway. In such way, the node is excluded from receiving requests in a smart fashion that would otherwise optimize resource load balancing. In some instances, such a node can first be utilized and requested to perform a task based on a random selection process (e.g., round-robin scheduling). For example, when the other nodes have their capacity occupied with other resources, one or more new nodes (e.g., including such node) can be instantiated to process new requests and handle the load from upcoming requests. In some instances, the new nodes would not be able to be distributed with requests based on the smart routing logic since they may not yet be configured and/or not registered at the interface gateway 220. In those instances, once an initial task is sent to a new node, the node can process the task and when providing the response, the new node can provide information for the resource status of the new node which can be used to register the new node at the interface gateway. In some other instances, new nodes can be configured and registered at the interface gateway as a separate operation outside of processing a task. For example, when a new node is instantiated, the new node can be configured to automatically send a notification to the interface gateway to register and provide a status report. Once the nodes are registered with the interface gateway 220, requests to the registered nodes can be handled in the smart fashion and intelligent routing implemented at the interface gateway 220. The interface gateway 220 can store logic for processing the nodes' statuses at the resource status matrix 230. In some instances, the statuses can be interactively updated based on new request routing and updated for the status of nodes provided after execution of a task. In some more instances, the statuses can be updated based on input from the nodes about their current statuses. For examples, nodes can be configured to provide updates to the interface gateway 220, e.g., on a predefined schedule such as every 24 hours, or upon an event, among other examples of configurations for sharing statuses of nodes.

The node can be registered at the interface gateway 220 based on a response from the node to the interface gateway 220, once a request for a task is sent to that node (e.g., as an initial communication between the interface 220 and a smart agent configured on that node). Once the node is registered at the interface gateway 220, the node is stored with a current status snapshot defining resource capacity of the node at the moment of registering. Such status can be dynamically updated based on further interactions between the interface gateway 220 and the node based on respective requests for execution of tasks.

For example, the interface gateway 220 can send a task for execution at the web service node 211. At the web service node 211, the smart agent 212 can receive the request that is distributed to the node 221 based on logic for distribution of tasks implemented at the interface gateway 220.

In some instances, once the node 211 receives the request for the task, the node can either directly initiate the task execution and/or can perform an evaluation to determine whether to accept or reject to execute the task, for example, based on evaluation of the task criteria and the current status of the web service node 211. In some instances, the smart agent can obtain information about the task requirements, e.g., memory consumption more than 5 GB and hard disk space more than 10 GB, and take a snapshot of the current status of the node 211. The smart agent 212 can evaluate the task requirements and the current status of the node 211 to determine whether the node 211 has sufficient resources to process the task. For example, such evaluation can be performed by a node that is not yet registered with the interface gateway 220. Once the node process the request, if the node 211 can perform the task, the node can provide a response together with information (e.g., snapshot) of the current status. It some instances, it can be appreciated that nodes from the web cluster may be reachable for requests from other entities outside the interface gateway, for example, to perform node update and/or upgrade tasks, to execute other maintenance tasks, among other example tasks that can be initiated at one of more of the nodes.

In some instances, a node that is registered with the interface gateway 220 may process requests based on received requests, with or without evaluation of the request. In some instances, when the interface gateway 220 sends requests based on implemented smart distribution logic including awareness of statuses of nodes and expected capacity of task execution, then a node that receives such request may perform the request without evaluating the task and/or the task requirements. In some instances, a node that is not yet registered with the interface gateway 220 may evaluate a received request first, and then determine to accept or reject it, and provide the status snapshot information. For example, if the node evaluates the tasks and determines that the task requires (e.g., based on predicted task requirements provided with the request from the interface gateway 220) more capacity, e.g., disk space, than what is available at the node, the node ay reject the execution of the task. In some instance, even if nodes provide their status to the interface gateway 220, the nodes may still be configured to perform an initial evaluation of the requested task, before executing the task and determine whether to accept or reject the execution of the task. In some instances, the nodes that are to interact with the interface gateway 220 can be provided with logic to determine when to evaluate received tasks and provide status information for their capacities, and/or whether to notify the interface gateway 220 for changes in their statuses, which may affect subsequent distribution of tasks.

If the smart agent 212 accepts the task, the tasks is executed at the node 211 and the smart agent 212 can, in some implementations, send updated status information of the node 211 to the interface gateway 220. The node 211 can provide a report including how much resources were consumed for executing the latest tasks and what is the current node status after the execution. This information about the current node status can be then used to update a relative (e.g., current) status of the node 211 in the resource status matrix 230. After the task is executed, the smart agent 212 can send a response for the task execution to the interface gateway 220 as a result. In some implementations, when the task is executed, the smart agent 212 can wait to send the result together with a snapshot of the resource state of the web service node 211 to the interface gateway 220. The snapshot can be sent as part of the content of a message sent to the interface gateway 220. The interface gateway 220 can use the information received from the agent 212 to populate data or to update data into the resource status matrix 230 for the node 211. The interface gateway 220 can obtain data about the status of each of the nodes provided by the web service cluster 205 to populate the resource status matrix 230. The information about the resource status can be received through direct feedback of the resource status as discussed for node 211, or through separate communication initiated by a smart agent configured on a node at the web service cluster 205. The smart agents on the web service nodes of the web service cluster 205 can be configured to communicate with the interface gateway 220 and to register resource statuses and/or changes in the resource status of the respective nodes. The interface gateway 220 can use the information at the resource status matrix 230 to determine and select a node to dispatch received requests for tasks and/or to determine whether further nodes are needed to be instantiated as part of the web service cluster 205 to serve requests for tasks from users, such as user 245. In some instances, the resource status matrix 230 can be updated based on each received response from a node of the cluster 205, for example, as received with a response to a task request.

In some instances, an updated resource status matrix can be used for subsequent evaluations associated with received requests for distributing tasks for processing at the web service cluster 205 at the interface gateway 220. In such instances, the next time a request is received at the interface gateway 220, smart routing evaluation logic 231 at the interface gateway 220 can be executed to determine an available node to handle the request based on evaluating information about the task criteria (resource requirements) and the resource status matrix for all the nodes registered to work with the interface gateway 220.

In some instances, if new nodes are added to the web service cluster 205, those nodes can be configured with smart agents, where if a request is sent to such a new node, the smart agent can process the request and provide a response with the resource status of the new node to register the new node at the interface gateway 220 and use the new node for subsequent request based on smart routing logic.

In accordance with implementations of the present disclosure, distributing task execution based on requirements of the tasks (based on a learning processes tailored to the processing characteristics at the web service cluster) and status of the nodes used for the execution can support fast processing of the task that provide dynamic notifications when a task cannot be executed within needed time constraints. The interface gateway 220 can consolidate data for the task execution requirements (resource requirements and/or task criteria) and up-to-date status of the nodes from the cluster registered for dispatching tasks according to a selection of a best suited node for processing the task according to resource requirement considerations. In such manner, the overall load of nodes can be evenly distributed.

In some instances, responses for executed task(s) at node(s) of the web service cluster 205 can include information about resources needed for the task execution. In some instances, resources are internal to the web service node, such as CPU usage, and resources external to the web service node, such as retrieving data from a database. Such information can be provided to the interface gateway 220 and used to refine the information for the task resource requirements 225 for the respective task type of the task, as maintained by the interface gateway 220.

Figure 3:
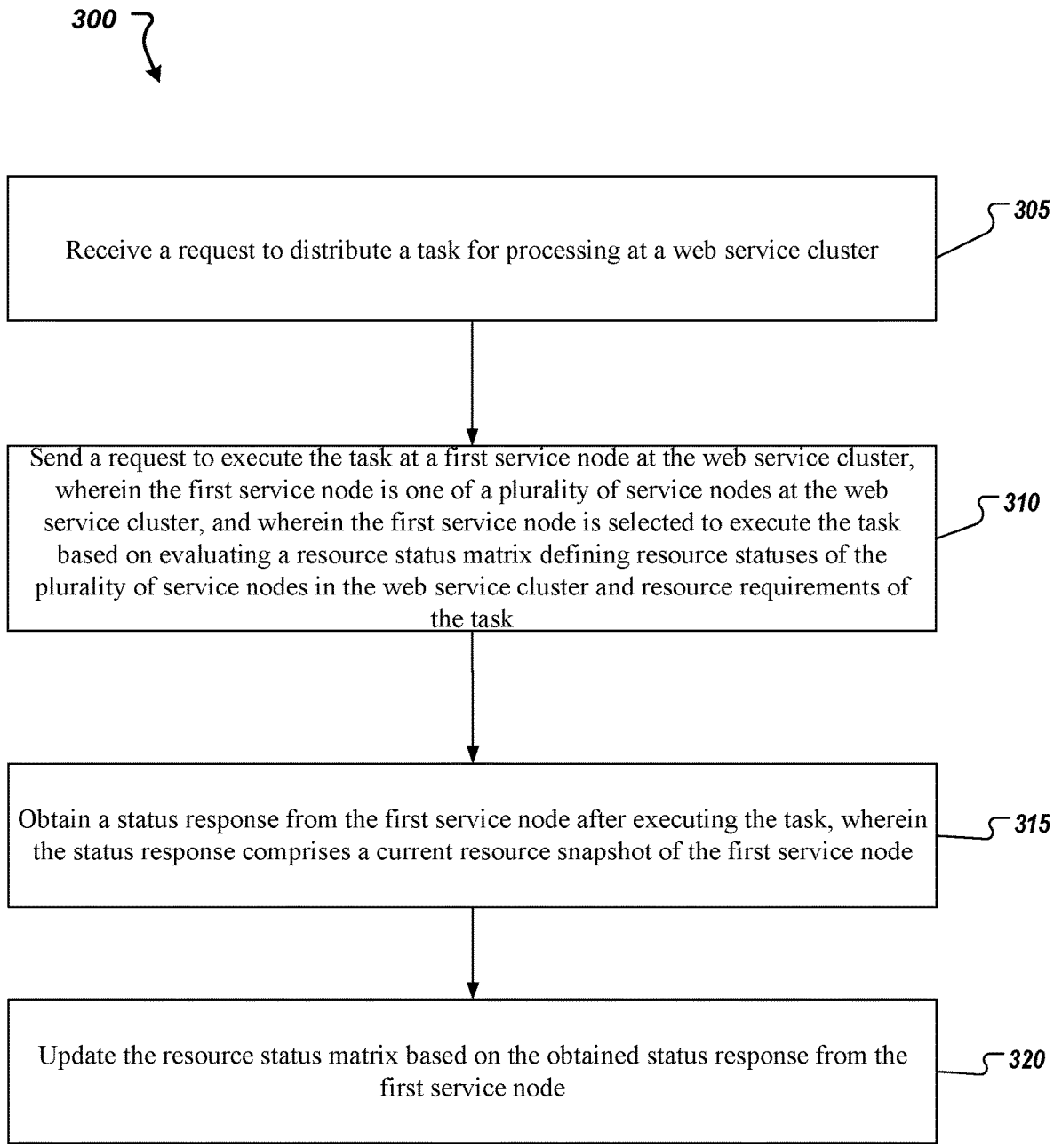
FIG. 3 is an example method flow diagram for routing requests for task execution in accordance with implementations of the present disclosure.

FIG. 3 is an example method flow diagram of a process 300 for routing requests for task execution in accordance with implementations of the present disclosure. The process 300 can be executed at an interface gateway such as the interface gateway 220 of FIG. 2.

At 305, a request is received at an interface gateway. The request is received to distribute a task for processing at a web service cluster. The web service cluster can be substantially similar to the web cluster 210 of FIG. 2. The web service cluster can include multiple service nodes that provide computing resources for executing tasks requested by users. The task can be distributed to a node from the web service cluster to perform computations on the node and thus to utilize the computing resources provided by the node.

At 310, a request for executing the task at a first service node of service nodes at the web service cluster is sent. The first service node is selected for executing the task based on evaluating a resource status matrix defining resource statuses of the service nodes in the web service cluster and resource requirements of the task.

At 315, a status response is obtained from the first service node after executing the task. The status response includes a current resource snapshot of the first service node. In some implementations, 315 can include two portions of data. A first part can include sending the snapshot status of the node to the interface gateway after the execution of the request is completed and the second part can include sending a result(s) of the execution of the task to the interface gateway 220. The resource snapshot and the results can be sent either together or separate, in parallel or sequentially, to the same or different components or the interface gateway 220.

At 320, the resource status matrix is updated based on the obtained status response from the first service node.

Figure 4:
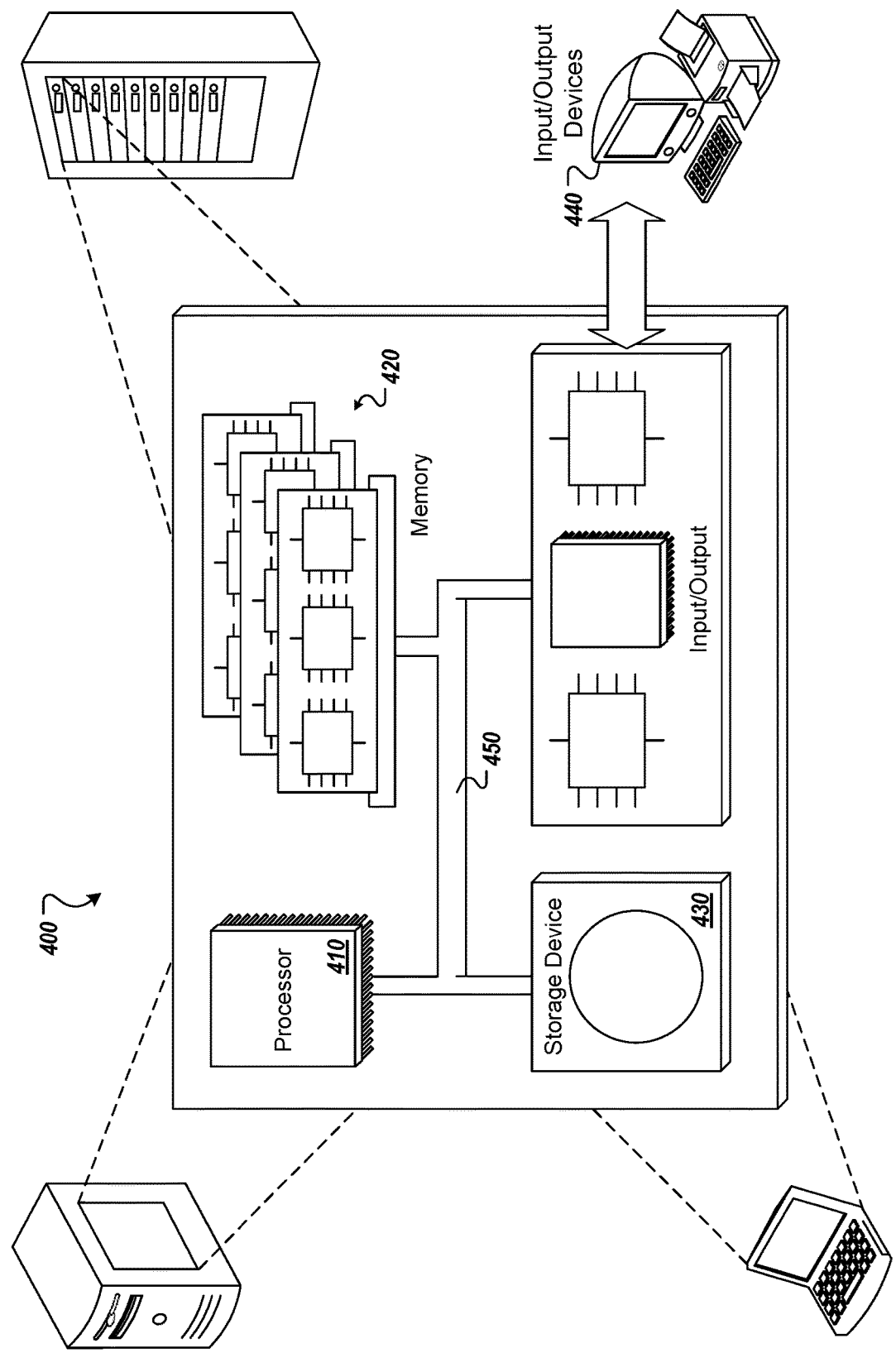
FIG. 4 is a schematic diagram of an example computer system that can be used to execute implementations of the present disclosure.

FIG. 4 is a schematic diagram of an example computer system 400 that can be used to execute implementations of the present disclosure. For example, the computer system 400 may be included in any or all of the server components discussed herein. The computer system 400 includes a processor 410, a memory 420, a storage device 430, and an input/output device 440. The components 410, 420, 430, and 440 are interconnected using a system bus 450. The processor 410 is capable of processing instructions for execution within the computer system 400. In some implementations, the processor 410 is a single-threaded processor. In some implementations, the processor 410 is a multi-threaded processor. The processor 410 is capable of processing instructions stored in the memory 420 or on the storage device 430 to display graphical information for a user interface on the input/output device 440.

The memory 420 stores information within the computer system 400. In some implementations, the memory 420 is a computer-readable medium. In some implementations, the memory 420 is a volatile memory unit. In some implementations, the memory 420 is a non-volatile memory unit. The storage device 430 is capable of providing mass storage for the system 400. In some implementations, the storage device 430 is a computer-readable medium. In some implementations, the storage device 430 may be a floppy disk device, a hard disk device, an optical disk device, or a tape device. The input/output device 440 provides input/output operations for the computer system 400. In some implementations, the input/output device 440 includes a keyboard and/or pointing device. In some implementations, the input/output device 440 includes a display unit for displaying graphical user interfaces.

The features described can be implemented in digital electronic circuitry, or in computer hardware, firmware, software, or combinations of them. The apparatus can be implemented in a computer program product tangibly embodied in an information carrier (e.g., in a machine-readable storage device, for execution by a programmable processor), and method operations can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or another unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory, or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a cathode ray tube (CRT) or liquid crystal display (LCD) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship between client and server arises by virtue of computer programs running on the respective computers and having a client-server relationship with each other.

In addition, the logic flows depicted in the figures do not require the particular order shown, or sequential order, to achieve desirable results. In addition, other operations may be provided, or operations may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

In view of the above described implementations of subject matter, this application discloses the following list of examples, wherein one feature of an example in isolation or more than one feature of said example taken in combination and, optionally, in combination with one or more features of one or more further examples are further examples also falling within the disclosure of this application.

Examples

Although the present application is defined in the attached claims, it should be understood that the present invention can also be (alternatively) defined in accordance with the following examples:

Example 1. A computer-implemented method comprising:
receiving, at an interface gateway, a request to distribute a task for processing at a web service cluster;
sending a request to execute the task at a first service node at the web service cluster, wherein the first service node is one of a plurality of service nodes at the web service cluster, and wherein the first service node is selected to execute the task based on evaluating a resource status matrix defining resource statuses of the plurality of service nodes in the web service cluster and resource requirements of the task;
obtaining a status response from the first service node after executing the task, wherein the status response comprises a current resource snapshot of the first service node; and
updating the resource status matrix based on the obtained status response from the first service node.

Example 2. The method of Example 1, wherein updating the resource status matrix comprises generating an updated resource status matrix for use for subsequent evaluations associated with received requests for distributing tasks for processing at the web service cluster at the interface gateway.

Example 3. The method of any of the preceding Examples, wherein the web service cluster provides resources for executing tasks of a set of task types, wherein a task type is associated with a task type criteria comprising corresponding resource requirements for executing a task of the task type at a service node, and wherein the method comprises:

maintaining information for resource requirements for types of tasks that are executable at service node on the web service cluster.

Example 4. The method of Example 3, the method comprising:
obtaining information for consumed resources by the first service node to execute the task; and
evaluating a first task criteria definition for a task type of the task executed by the first service node to determine whether to adjust the resource requirements for the task.

Example 5. The method of the preceding Examples, comprising:
determining resource requirements for a plurality of tasks executable by service nodes of the web service cluster, wherein each of the plurality of tasks is associated with resource requirements corresponding to a respective type of the task.

Example 6. The method of Example 5, wherein the resource requirements for executing a task of a first task type are determined based on evaluating historical data for executed tasks of the first task type at one or more service nodes at the web service cluster.

Example 7. The method of any of the preceding Examples, the method comprising:
registering, at the interface gateway, the service nodes of the web service cluster for processing requests received at the interface gateway.

Example 8. The method of any of the preceding Examples, the method comprising:
receiving from a first service node a current status snapshot of the first service node.

Example 9. A system comprising:
one or more processors; and
one or more computer-readable memories coupled to the one or more processors and having instructions stored thereon that are executable by the one or more processors to perform the method of any of Examples 1 to 8.

Example 10: A non-transitory, computer-readable medium coupled to one or more processors and having instructions stored thereon which, when executed by the one or more processors, cause the one or more processors to perform the method of any of Examples 1 to 8.

What is claimed is:

1. A non-transitory, computer-readable medium coupled to one or more processors and having instructions stored thereon which, when executed by the one or more processors, cause the one or more processors to perform operations comprising:
receiving, at an interface gateway, a request to distribute a task for processing at a web service cluster;
instructing execution of the task at a first service node at the web service cluster based on evaluating a resource status matrix and resource requirements of the task, wherein the resource status matrix defines statuses for respective resources available to be provided by each of a plurality of service nodes in the web service cluster and resource requirements of the task, wherein the first service node is one of the plurality of service nodes at the web service cluster;
obtaining a response from the first service node after executing the task, wherein the response comprises a current resource snapshot of the first service node, the current resource snapshot indicating an updated status for resources available to be provided by the first service node, and wherein the resource comprises information for consumed resources by the first service node to execute the task;

adjusting the resource requirements for the task based on the information for the consumed resources by the first service node to execute the task;

updating the resource status matrix based on the obtained response from the first service node to generate an updated resource status matrix;

providing the updated resource status matrix and the adjusted resource requirements for the task for evaluation and selection of a second service node of the plurality of service nodes to execute a new instance of the task; and instructing the executing of the task at the second service node.

2. The non-transitory computer-readable medium of claim 1, wherein the updated resource status matrix is usable for subsequent evaluations associated with received requests for distributing tasks for processing at the web service cluster at the interface gateway.

3. The non-transitory computer-readable medium of claim 1, wherein the web service cluster provides resources for executing tasks of a set of task types, wherein a task type is associated with a task type criteria comprising corresponding resource requirements for executing a task of the task type at a service node, and wherein the computer-readable medium stores instructions, which when executed on the one or more processors, cause the one or more processors to perform operations comprising:

maintaining information for resource requirements for types of tasks that are executable at service node on the web service cluster.

4. The non-transitory computer-readable medium of claim 1, wherein the computer-readable medium stores instructions, which when executed on the one or more processors, cause the one or more processors to perform operations comprising:

determining resource requirements for a plurality of tasks executable by service nodes of the web service cluster, wherein each of the plurality of tasks is associated with resource requirements corresponding to a respective type of the task.

5. The non-transitory computer-readable medium of claim 4, wherein the resource requirements for executing a task of a first task type are determined based on evaluating historical data for executed tasks of the first task type at one or more service nodes at the web service cluster.

6. The non-transitory computer-readable medium of claim 4, wherein the computer-readable medium stores instructions, which when executed on the one or more processors, cause the one or more processors to perform operations comprising:

registering, at the interface gateway, the plurality of service nodes of the web service cluster for processing requests received at the interface gateway.

7. The non-transitory computer-readable medium of claim 1, wherein the computer-readable medium stores instructions, which when executed on the one or more processors, cause the one or more processors to perform operations comprising:

dispatching a request for the new instance of the task to the second service node in response to determining the second service node's resource status is appropriate for executing the new instance of the task;

determining, by the second service node, if it has sufficient resources to execute the new instance of the task;

rejecting, by the second service node, the execution of the new instance of the task if the determining, by the second service node, was that it had insufficient resources to execute the new instance of the task; and evaluating the resource status matrix to determine a third server node as appropriate for executing the new instance of the task.

8. A computer-implemented method, the method comprising:

receiving, at an interface gateway, a request to distribute a task for processing at a web service cluster;

instructing execution of the task at a first service node at the web service cluster based on evaluating a resource status matrix and resource requirements of the task, wherein the resource status matrix defines statuses for respective resources available to be provided by each of a plurality of service nodes in the web service cluster and resource requirements of the task, wherein the first service node is one of the plurality of service nodes at the web service cluster;

obtaining a response from the first service node after executing the task, wherein the response comprises a current resource snapshot of the first service node, the current resource snapshot indicating an updated status for resources available to be provided by the first service node, and wherein the resource comprises information for consumed resources by the first service node to execute the task;

adjusting the resource requirements for the task based on the information for the consumed resources by the first service node to execute the task;

updating the resource status matrix based on the obtained response from the first service node to generate an updated resource status matrix;

providing the updated resource status matrix and the adjusted resource requirements for the task for evaluation and selection of a second service node of the plurality of service nodes to execute a new instance of the task; and instructing the executing of the task at the second service node.

9. The method of claim 8, wherein the updated resource status matrix is usable for subsequent evaluations associated with received requests for distributing tasks for processing at the web service cluster at the interface gateway.

10. The method of claim 8, wherein the web service cluster provides resources for executing tasks of a set of task types, wherein a task type is associated with a task type criteria comprising corresponding resource requirements for executing a task of the task type at a service node, and wherein the method comprises:

maintaining information for resource requirements for types of tasks that are executable at service node on the web service cluster.

11. The method of claim 8, comprising:

determining resource requirements for a plurality of tasks executable by service nodes of the web service cluster, wherein each of the plurality of tasks is associated with resource requirements corresponding to a respective type of the task.

12. The method of claim 11, wherein the resource requirements for executing a task of a first task type are determined based on evaluating historical data for executed tasks of the first task type at one or more service nodes at the web service cluster.

13. The method of claim 8, the method comprising:
registering, at the interface gateway, the plurality of service nodes of the web service cluster for processing requests received at the interface gateway.

14. The method of claim 8, the method comprising:
dispatching a request for the new instance of the task to the second service node in response to determining the second service node's resource status is appropriate for executing the new instance of the task;
determining, by the second service node, if it has sufficient resources to execute the new instance of the task;
rejecting, by the second service node, the execution of the new instance of the task if the determining, by the second service node, was that it had insufficient resources to execute the new instance of the task; and
evaluating the resource status matrix to determine a third server node as appropriate for executing the new instance of the task.

15. A system comprising:
one or more processors; and
one or more computer-readable memories coupled to the one or more processors and having instructions stored thereon that are executable by the one or more processors to perform operations comprising:
  receiving, at an interface gateway, a request to distribute a task for processing at a web service cluster;
  instructing execution of the task at a first service node at the web service cluster based on evaluating a resource status matrix and resource requirements of the task, wherein the resource status matrix defines statuses for respective resources available to be provided by each of a plurality of service nodes in the web service cluster and resource requirements of the task, wherein the first service node is one of the plurality of service nodes at the web service cluster;
  obtaining a response from the first service node after executing the task, wherein the response comprises a current resource snapshot of the first service node, the current resource snapshot indicating an updated status for resources available to be provided by the first service node, and wherein the resource comprises information for consumed resources by the first service node to execute the task;
  adjusting the resource requirements for the task based on the information for the consumed resources by the first service node to execute the task;
  updating the resource status matrix based on the obtained response from the first service node to generate an updated resource status matrix;
  providing the updated resource status matrix and the adjusted resource requirements for the task for evaluation and selection of a second service node of the plurality of service nodes to execute a new instance of the task; and
  instructing the executing of the task at the second service node.

16. The system of claim 15, wherein the updated resource status matrix is usable for subsequent evaluations associated with received requests for distributing tasks for processing at the web service cluster at the interface gateway.

17. The system of claim 15, wherein the web service cluster provides resources for executing tasks of a set of task types, wherein a task type is associated with a task type criteria comprising corresponding resource requirements for executing a task of the task type at a service node, and wherein the one or more computer-readable memories store further instructions, which when executed on the one or more processors, cause the one or more processors to perform operations comprising:
  maintaining information for resource requirements for types of tasks that are executable at service node on the web service cluster.

18. The system of claim 15, wherein the one or more computer-readable memories store further instructions, which when executed by the one or more processors, cause the one or more processors to perform operations comprising:
  determining resource requirements for a plurality of tasks executable by service nodes of the web service cluster, wherein each of the plurality of tasks is associated with resource requirements corresponding to a respective type of the task.

19. The system of claim 18, wherein the resource requirements for executing a task of a first task type are determined based on evaluating historical data for executed tasks of the first task type at one or more service nodes at the web service cluster.

20. The system of claim 15, wherein the one or more computer-readable memories store further instructions, which when executed by the one or more processors, cause the one or more processors to perform operations comprising:
  dispatching a request for the new instance of the task to the second service node in response to determining the second service node's resource status is appropriate for executing the new instance of the task;
  determining, by the second service node, if it has sufficient resources to execute the new instance of the task;
  rejecting, by the second service node, the execution of the new instance of the task if the determining, by the second service node, was that it had insufficient resources to execute the new instance of the task; and
  evaluating the resource status matrix to determine a third server node as appropriate for executing the new instance of the task.

* * * * *